United States Patent
Seufert et al.

(10) Patent No.: US 10,360,210 B2
(45) Date of Patent: Jul. 23, 2019

(54) OPTIMIZING SINGLE-VALUE DATABASE READ OPERATIONS USING A SINGLE VALUE CACHE

(71) Applicants: Thomas Seufert, Plankstadt (DE); Steffen Geissinger, Wiesloch (DE)

(72) Inventors: Thomas Seufert, Plankstadt (DE); Steffen Geissinger, Wiesloch (DE)

(73) Assignee: SAP SE, Walldorf (DE)

( * ) Notice: Subject to any disclaimer, the term of this patent is extended or adjusted under 35 U.S.C. 154(b) by 286 days.

(21) Appl. No.: 14/274,973

(22) Filed: May 12, 2014

(65) Prior Publication Data

US 2015/0324382 A1    Nov. 12, 2015

(51) Int. Cl.
*G06F 16/2453*    (2019.01)
*G06F 16/14*    (2019.01)
*G06F 16/172*    (2019.01)
*G06F 16/951*    (2019.01)
*G06F 16/22*    (2019.01)

(52) U.S. Cl.
CPC .......... *G06F 16/2453* (2019.01); *G06F 16/14* (2019.01); *G06F 16/172* (2019.01); *G06F 16/2282* (2019.01); *G06F 16/951* (2019.01)

(58) Field of Classification Search
CPC ............... G06F 17/30; G06F 17/30339; G06F 17/30132; G06F 17/30864; G06F 17/301

USPC .................................................. 707/696, 803
See application file for complete search history.

(56) References Cited

U.S. PATENT DOCUMENTS

| | | | | |
|---|---|---|---|---|
| 5,611,076 A | * | 3/1997 | Durflinger | ........ G06F 17/30569 707/999.102 |
| 6,550,057 B1 | * | 4/2003 | Bowman-Amuah | ... G06F 17/30 700/80 |
| 2011/0191303 A1 | * | 8/2011 | Kaufman | .......... G06F 17/30286 707/684 |
| 2013/0318128 A1 | * | 11/2013 | Zahn | ................. G06F 17/30595 707/803 |
| 2014/0136473 A1 | * | 5/2014 | Faerber | ............. G06F 17/30315 707/607 |
| 2015/0046413 A1 | * | 2/2015 | Andrei | .............. G06F 17/30309 707/695 |

* cited by examiner

*Primary Examiner* — Hosain T Alam
*Assistant Examiner* — Tracy M McGhee
(74) *Attorney, Agent, or Firm* — Fish & Richardson P.C.

(57) ABSTRACT

The present disclosure describes methods, systems, and computer program products for optimizing single-value database read operations. One computer-implemented method includes initializing, by a computer, a single value cache associated with a created database table where a column of the database table contains a single or unique data value, verifying that the created database table is in a useable state, performing an operation on the database table, and retrieving the data value from the single value cache without locking the column containing the single or unique data value.

20 Claims, 4 Drawing Sheets

OPTIMIZING SINGLE-VALUE DATABASE READ OPERATIONS USING A SINGLE VALUE CACHE

BACKGROUND

In enterprise resource planning (ERP) scenarios, database table columns are often filled with a single value for each row and storing data for special cases of the application. For most customers these columns are filled with an initial value. To read values from columns in a column-store table, such as in an in-memory database, a lock is acquired on a column to make sure data is not being modified in parallel. In scenarios selecting single rows, a notable overhead penalty can be introduced because the whole column has to be locked to read a single value. The amount of users that can be handled in parallel is then limited to the operation of the locking mechanism. An underperforming locking mechanism can result high user lockout causing user dissatisfaction, loss of revenue, a poor user experience, and/or rejection of an ERP application in favor of a competing product.

SUMMARY

The present disclosure relates to computer-implemented methods, computer-readable media, and computer systems for optimizing single-value database read operations. One computer-implemented method includes initializing, by a computer, a single value cache associated with a created database table where a column of the database table contains a single or unique data value, verifying that the created database table is in a useable state, performing an operation on the database table, and retrieving the data value from the single value cache without locking the column containing the single or unique data value.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, wherein the single value cache is part of metadata associated with the database table.

A second aspect, combinable with any of the previous aspects, wherein the single value cache is initialized based on data in a main and a delta storage associated with the database table.

A third aspect, combinable with any of the previous aspects, wherein data stored in the single value cache is stored as a raw data value.

A fourth aspect, combinable with any of the previous aspects, wherein the main and delta storage each has a data dictionary used to combine values in the main and the delta storage to determine if a single value cache should be persisted for the database table.

A fifth aspect, combinable with any of the previous aspects, wherein in operations where the database table is exclusively locked, all table columns are scanned for single or unique values using a value dictionary associated with each column to determine how many distinct values are being used in each column.

A sixth aspect, combinable with any of the previous aspects, wherein the single value cache is marked as dirty until an exclusively lock phase occurs for the database table.

A seventh aspect, combinable with any of the previous aspects, wherein NULL values are treated as normal values.

The subject matter described in this specification can be implemented in particular implementations so as to realize one or more of the following advantages. First, a single value read operation performed against a database table metadata single value cache (SVC) is lock-free. This is advantageous from the perspective of scaling. Lock-free reading of data will not impact scaling. Second, if it is known that a column (in a column store database) or a row in a row-store database only has a single value, the value can be read from a SVC as opposed to reading the value from the database table. Reading from the SVC is generally faster as there is no need to load column data. Third, memory overhead for columns/rows with a single value can be reduced because there is no need to instantiate basic data structures for a column/row if its value is cached. Fourth, in some implementations, hardware features, such as the INTEL "Transactional Synchronization Extensions" introduced into microprocessors can be used to replace synchronization of parallel database operations on an empty table and reduce synchronization overhead. Fifth, in some implementations, a SVC can be used not only for simple data types (e.g., numeric and string types), but for complex data types (e.g., text, large objects (LOBs), multi-values, geospatial data, etc.). Sixth, it is better performance-wise to read from a SVC instead of a data store. For example, typically, in the SVC, cached values are stored near to each other in a memory and, in some instances, can fit into a CPU cache. Reading data from a data store might need to pick values from various places in data store memory which reduces read performance. Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

The following detailed description is presented to enable any person skilled in the art to make, use, and/or practice the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

This disclosure generally describes computer-implemented methods, computer-program products, and systems for optimizing single-value database read operations. Although the following description is focused on column-store databases, the described computer-implemented methods, computer-program products, and systems are also applicable to conventional row-store or other types of databases.

In enterprise resource planning (ERP) scenarios, database table columns are often filled with a single (or unique) value for each row and storing data for special cases of the application. For example, in practice most countries in the world have their own rules for taxes, laws, etc. An ERP system might have to deal with such special cases (e.g., when filing an invoice) and probably needs to store some data for these specialties (e.g., typically in database table columns). For most countries these special columns are not used and filled with a single value (e.g., a NULL or some other value such as an empty string or zero for numeric types). Processing and returning a query for a single row, especially for very small result sets, is processing intensive, especially for many queries. For most customers these columns are filled with an initial value. To read values from columns in a column-store table, such as in an in-memory database, a lock is acquired on a column to make sure data is not being modified in parallel. In scenarios selecting single rows, a notable overhead penalty can be introduced because the whole column has to be locked to read a single value. The amount of users that can be handled in parallel is then limited to the operation of the locking mechanism. An underperforming locking mechanism can result high user lockout causing user dissatisfaction, loss of revenue, a poor user experience, and/or rejection of an ERP application in favor of a competing product.

In order to eliminate the above-described penalty, a single value cache (SVC) optimization technique is introduced into a column-store database. For columns with a single (or unique) value, the raw value of the single value is, in some implementations, stored in database table metadata as a SVC. In other implementations, the raw value can be stored wholly apart from the database or partially in the database table metadata. During database READ operations, the cached value can be accessed without having to lock the requested column. A challenge to this technique is to invalidate the cached value in a lock-free way if table data changes and to return a correct value in a transactional context.

In the lifecycle of a table in column-store database, there are phases where the entire table is exclusively locked, (e.g., delta log replay, delta merge, storage compression optimization, etc.). In some implementations, all table columns are scanned for single values in one or more of these or other phases where the table is locked exclusively. In some implementations, a column value dictionary is queried as to how many distinct values are being used in the column. In the case of a single value, the single value is marked for caching it the SVC. In some implementations, in the case of no value (e.g., NULL), the NULL value is marked for caching in the SVC. In other words, a NULL value is treated similarly as other values.

In some implementations of column-oriented data stores, there is typically a main and delta storage for each column—storing "root"/main content and changes (deltas) from the root/main content, respectively. In some implementations, each storage also has an individual data dictionary describing, among other things, meaning, relationships to other data, origin, usage, and format of the storage. To compute single values, findings for both storages are combined and persisted wholly or partially in the database table metadata. Both storages (main and delta) are individually scanned for single values. If it is found that there is no single value in any of both stores, there will be no cache entry. If found that both storages have a single value, both single values are compared. In the case where both single values are not identical, there will be no cache entry. Otherwise, a single value has been found and it is put into a SVC. Both stores have to show the same single value. In a case where there is old data in the main store that is not visible anymore and the delta store contains new data for that row, then a conservative approach is taken and the entry is not cached. For example:

Delta(20140415)+Main(20140415)=>entry

Delta(20140501)+Main(20140415)=>no entry

Delta(20140415 and 20140501)+Main(20140415)
=>no entry.

If one of the storages associated with a column is not loaded (e.g., in a case on memory shortage—might be unloaded to make some memory space—or when the engine is aware and/or determines that data is not being read from one of the stores), it is treated as if no single value was found in order to avoid unnecessary loading. Delta storage is a write-optimized data store and main storage is a read-optimized data store. In some implementations, delta storage is periodically merged into the main storage (e.g., on an automatic, timed basis, manually, etc.).

During operations on the table (e.g., using operation of a data manipulation language (DML) such a structured query language (SQL), etc.)—such as INSERT, UPDATE, REPLACE, etc.—a check is performed as to whether there are new values for columns that are in the cache. In case where there are no new values, the cached value remains unchanged and valid. In case where there are new values, the entry in the cache is marked as "dirty" but will remain in the cache until the next exclusively lock phase for a table as described above. Dirty cache values cannot be read anymore, meaning the data has to be read from the column in the traditional way to ensure correctness. Because these entries are immediately flagged as being dirty, new transactions will not read the dirty value from the cache. Typically, for transactions that are currently running in parallel, the cached value is considered invalid from a conservative data strategy. In other implementations, the cached value can be considered valid, because the updated values are not yet visible. In some implementations, the visibility depends on an isolation level—some databases support dirty reads (e.g., read uncommitted isolation level).

In the case where a table is empty and an operation performs a data INSERT for the first time, the first value for each column in the cache is stored. In case of a batch insertion on an empty table, values are added to the cache that has the same value for all inserted values of a column. Parallel operations (e.g., DML) on an empty table are synchronized.

In typical situations with both a READ and a WRITE transaction, if a writer changed the SVC and marked the SVC as dirty, the reader would not be permitted to read from the SVC (since marked dirty). However, in other implementations, as described above, the reader may, under some circumstances, be permitted to ready from the SVC.

Figure 1:
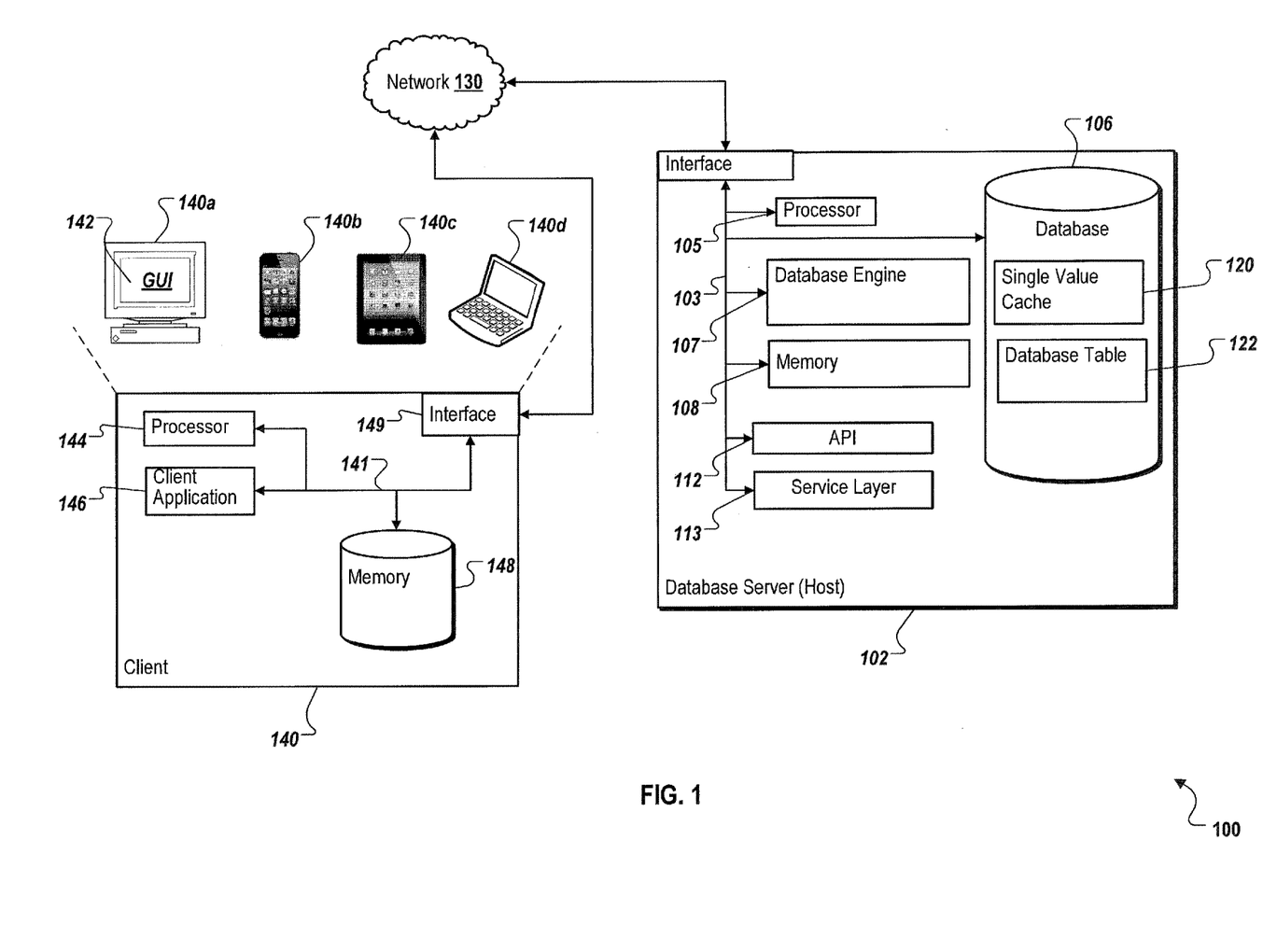
FIG. 1 is a block diagram illustrating an example distributed computing system for optimizing single-value database read operations according to an implementation.

FIG. 1 is a block diagram illustrating an example distributed computing system (EDCS) 100 for optimizing single-value database read operations according to an implementation. The illustrated EDCS 100 includes or is communicably coupled with a database server (host) 102 and a client 140 (an example of a computing device as mentioned above) that communicate across a network 130. In some implementations, one or more components of the EDCS 100 may be configured to operate within a cloud-computing-based environment.

At a high level, the host 102 is an electronic computing device operable to receive, transmit, process, store, or manage data and information associated with the EDCS 100. In general, the host 102 is a database server providing database functionality, including database functionality using a SVC. According to some implementations, the host 102 may also include or be communicably coupled with an e-mail server, a web server, a caching server, a streaming data server, a business intelligence (BI) server, and/or other server.

The host 102 is responsible for receiving, among other things, requests and content from one or more client applications 146 associated with the client 140 of the EDCS 100 and responding to the received requests. In some implementations, the host 102 processes the requests at least in the database engine 107. In addition to requests received from the client 140, requests may also be sent to the host 102 from internal users, external or third-parties, other automated applications, as well as any other appropriate entities, individuals, systems, or computers. In some implementations, various requests can be sent directly to host 102 from a user accessing host 102 directly (e.g., from a server command console or by other appropriate access method).

Each of the components of the host 102 can communicate using a system bus 103. In some implementations, any and/or all the components of the host 102, both hardware and/or software, may interface with each other and/or the interface 104 over the system bus 103 using an application programming interface (API) 112 and/or a service layer 113. The API 112 may include specifications for routines, data structures, and object classes. The API 112 may be either computer-language independent or dependent and refer to a complete interface, a single function, or even a set of APIs. The service layer 113 provides software services to the EDCS 100. The functionality of the host 102 may be accessible for all service consumers using this service layer. Software services, such as those provided by the service layer 113, provide reusable, defined business functionalities through a defined interface. For example, the interface may be software written in JAVA, C++, or other suitable language providing data in extensible markup language (XML) format or other suitable format.

While illustrated as an integrated component of the host 102 in the EDCS 100, alternative implementations may illustrate the API 112 and/or the service layer 113 as stand-alone components in relation to other components of the EDCS 100. Moreover, any or all parts of the API 112 and/or the service layer 113 may be implemented as child or sub-modules of another software module, enterprise application, or hardware module without departing from the scope of this disclosure. For example, the API 112 could be integrated into the database 106, the database engine 107, and/or wholly or partially in other components of host 102 (whether or not illustrated).

The host 102 includes an interface 104. Although illustrated as a single interface 104 in FIG. 1, two or more interfaces 104 may be used according to particular needs, desires, or particular implementations of the EDCS 100. The interface 104 is used by the host 102 for communicating with other systems in a distributed environment—including within the EDCS 100—connected to the network 130; for example, the client 140 as well as other systems communicably coupled to the network 130 (whether illustrated or not). Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated EDCS 100.

The host 102 includes a processor 105. Although illustrated as a single processor 105 in FIG. 1, two or more processors may be used according to particular needs, desires, or particular implementations of the EDCS 100. Generally, the processor 105 executes instructions and manipulates data to perform the operations of the host 102. Specifically, the processor 105 executes the functionality required for optimizing single-value database read operations.

The host 102 also includes a database 106 that holds data for the host 102, client 140, and/or other components of the EDCS 100. Although illustrated as a single database 106 in FIG. 1, two or more databases may be used according to particular needs, desires, or particular implementations of the EDCS 100. While database 106 is illustrated as an integral component of the host 102, in alternative implementations, database 106 can be external to the host 102 and/or the EDCS 100. In some implementations, database 106 can be configured to store one or more instances of SVCs 120 (as described above), database tables 122, and/or other appropriate data (e.g., user profiles, objects and content, client data, etc.). Although, as stated above, the description is focused on column-store databases, the described computer-implemented methods, computer-program products, and systems are applicable to conventional row-store or other types of databases consistent and/or compatible with this disclosure. The database operations of the database 106 are modified to use the SVC as appropriate (e.g., refer to FIG. 4 for example operations).

The database engine 107 is an algorithmic software engine capable of providing, among other things, any appropriate database function consistent with this disclosure for database 106. In some implementations, the database engine 107 can provide and/or modify content provided by and/or made available to other components of the EDCS 100. In other words, the database engine 107 can act in conjunction with one or more other components of the host 102 and/or EDCS 100 in responding to a request for content received from the client 140.

Although illustrated as a single database engine 107, the database engine 107 may be implemented as multiple DCEs 107. In addition, although illustrated as integral to the host 102, in alternative implementations, the database engine 107 can be external to the host 102 and/or the EDCS 100 (e.g., wholly or partially executing on the client 140, other host 102 (not illustrated), etc.). Once a particular database engine 107 is launched, the particular database engine 107 can be used, for example by an application or other component of the EDCS 100 to interactively process received database requests. In some implementations, the database engine 107 may be a network-based, web-based, and/or other suitable application consistent with this disclosure.

In some implementations, a particular database engine 107 may operate in response to and in connection with at least one request received from other database engines 107, other components (e.g., software and/or hardware modules) associated with another host 102, and/or other components of the EDCS 100. In some implementations, the database engine 107 can be accessed and executed in a cloud-based computing environment using the network 130. In some implementations, a portion of a particular database engine 107 may be a web service associated with the database engine 107 that is remotely called, while another portion of the database engine 107 may be an interface object or agent bundled for processing by any suitable component of the EDCS 100. Moreover, any or all of a particular database engine 107 may be a child or sub-module of another software module or application (not illustrated) without departing from the scope of this disclosure. Still further, portions of the particular database engine 107 may be executed or accessed by a user working directly at the host 102, as well as remotely at a corresponding client 140. In some implementations, the host 102 or any suitable component of host 102 or the EDCS 100 can execute the database engine 107.

The memory 108 typically stores objects and/or data associated with the purposes of the host 102 but may also be used in conjunction with the database 106 to store, transfer, manipulate, etc. objects and/or data. The memory 108 can also consistent with other memories within the EDCS 100 and be used to store data similar to that stored in the other memories of the EDCS 100 for purposes such as backup, caching, and/or other purposes.

The client 140 may be any computing device operable to connect to and/or communicate with at least the host 102. In general, the client 140 comprises an electronic computing device operable to receive, transmit, process, and store any appropriate data associated with the EDCS 100, for example, the database engine 107. More particularly, among other things, the client 140 can collect content from the client 140 and upload the collected content to the host 102 for integration/processing into/by the database engine 107. The client typically includes a processor 144, a client application 146, a memory 148, and/or an interface 149 interfacing over a system bus 141.

The client application 146 is any type of application that allows the client 140 to navigate to/from, request, view, create, edit, delete, administer, and/or manipulate content associated with the host 102 and/or the client 140. For example, the client application 146 can present GUI displays and associated data to a user generated by the database engine 107, accept user input, and transmit the user input back to the host 102 for dissemination to the appropriate components of host 102, in particular the database engine 107. In some implementations, the client application 146 can use parameters, metadata, and other information received at launch to access a particular set of data from the host 102 and/or other components of the EDCS 100. Once a particular client application 146 is launched, a user may interactively process a task, event, or other information associated with the host 102 and/or other components of the EDCS 100. For example, the client application 146 can generate and transmit a particular database request to the host 102.

In some implementations, the client application 146 can also be used perform administrative functions related to the database engine 107. For example, the database engine 107 can generate and/or transmit administrative pages to the client application 146 based on a particular user login, request, etc.

Further, although illustrated as a single client application 146, the client application 146 may be implemented as multiple client applications in the client 140. For example, there may be a native client application and a web-based (e.g., HTML) client application depending upon the particular needs of the client 140 and/or the EDCS 100.

The interface 149 is used by the client 140 for communicating with other computing systems in a distributed computing system environment, including within the EDCS 100, using network 130. For example, the client 140 uses the interface to communicate with a host 102 as well as other systems (not illustrated) that can be communicably coupled to the network 130. The interface 149 may be consistent with the above-described interface 104 of the host 102. The processor 144 may be consistent with the above-described processor 105 of the host 102. Specifically, the processor 144 executes instructions and manipulates data to perform the operations of the client 140, including the functionality required to send requests to the host 102 and to receive and process responses from the host 102.

The memory 148 typically stores objects and/or data associated with the purposes of the client 140 but may also be consistent with the above-described database 106 and/or memory 108 of the host 102 or other memories within the EDCS 100 and be used to store data similar to that stored in the other memories of the EDCS 100 for purposes such as backup, caching, and the like.

Further, the illustrated client 140 includes a GUI 142 that interfaces with at least a portion of the EDCS 100 for any suitable purpose. For example, the GUI 142 (illustrated as associated with client 140*a*) may be used to view data associated with the client 140, the host 102, or any other component of the EDCS 100. In particular, in some implementations, the client application 146 may render GUI interfaces received from the database engine 107 and/or display data retrieved from database 106 using the database engine 107.

There may be any number of clients 140 associated with, or external to, the EDCS 100. For example, while the illustrated EDCS 100 includes one client 140 communicably coupled to the host 102 using network 130, alternative implementations of the EDCS 100 may include any number of clients 140 suitable to the purposes of the EDCS 100. Additionally, there may also be one or more additional clients 140 external to the illustrated portion of the EDCS 100 that are capable of interacting with the EDCS 100 using the network 130. Further, the term "client" and "user" may be used interchangeably as appropriate without departing from the scope of this disclosure. Moreover, while the client 140 is described in terms of being used by a single user, this disclosure contemplates that many users may use one computer, or that one user may use multiple computers.

The illustrated client 140 (example configurations illustrated as 140*a*-140*d*) is intended to encompass any computing device such as a desktop computer/server, laptop/notebook computer, wireless data port, smart phone, personal data assistant (PDA), tablet computing device, one or more processors within these devices, or any other suitable processing device. For example, the client 140 may comprise a computer that includes an input device, such as a keypad, touch screen, or other device that can accept user information, and an output device that conveys information associated with the operation of the host 102 or the client 140 itself, including digital data, visual and/or audio information, or a GUI 142 (illustrated by way of example only with respect to the client 140a).

Figure 2:
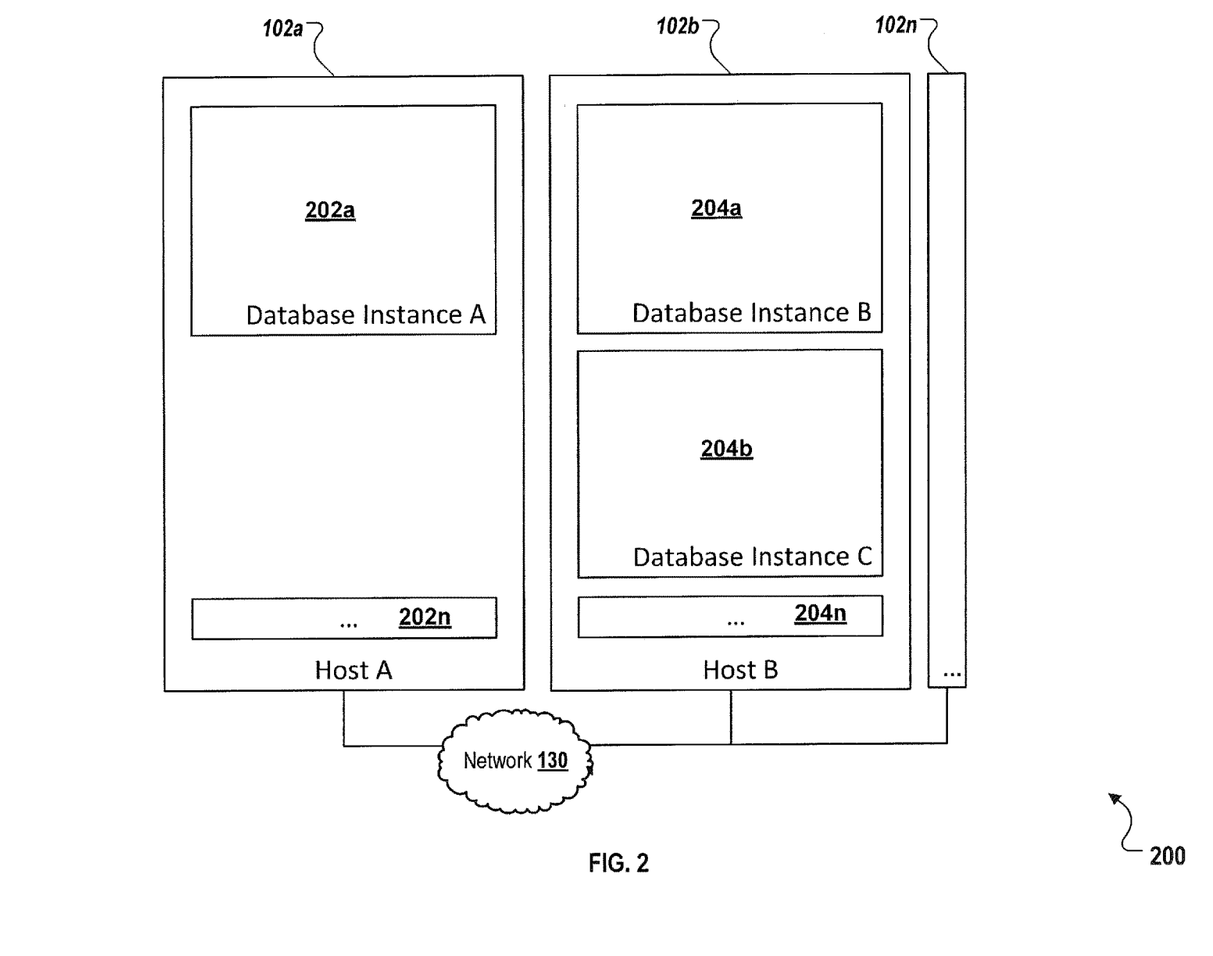
FIG. 2 is a block diagram illustrating example database servers (hosts) of FIG. 1 and associated database instances according to an implementation.

FIG. 2 is a block diagram 200 illustrating example database servers (hosts) of FIG. 1 and associated database instances according to an implementation. Multiple hosts 102 are illustrated (e.g., 102a, 102b, . . . , 102n), the hosts 102 communicating over network 130. Each host has one or more particular instances of a database executing. For example, host 102a (Host A) is associated with database instance 202a (Database Instance A) and database instance 202n (unnamed). Similarly, host 102b (Host B) is associated with database instance 204a (Database Instance B), 204b (Database Instance C), and database instance 204n.

Figure 3:
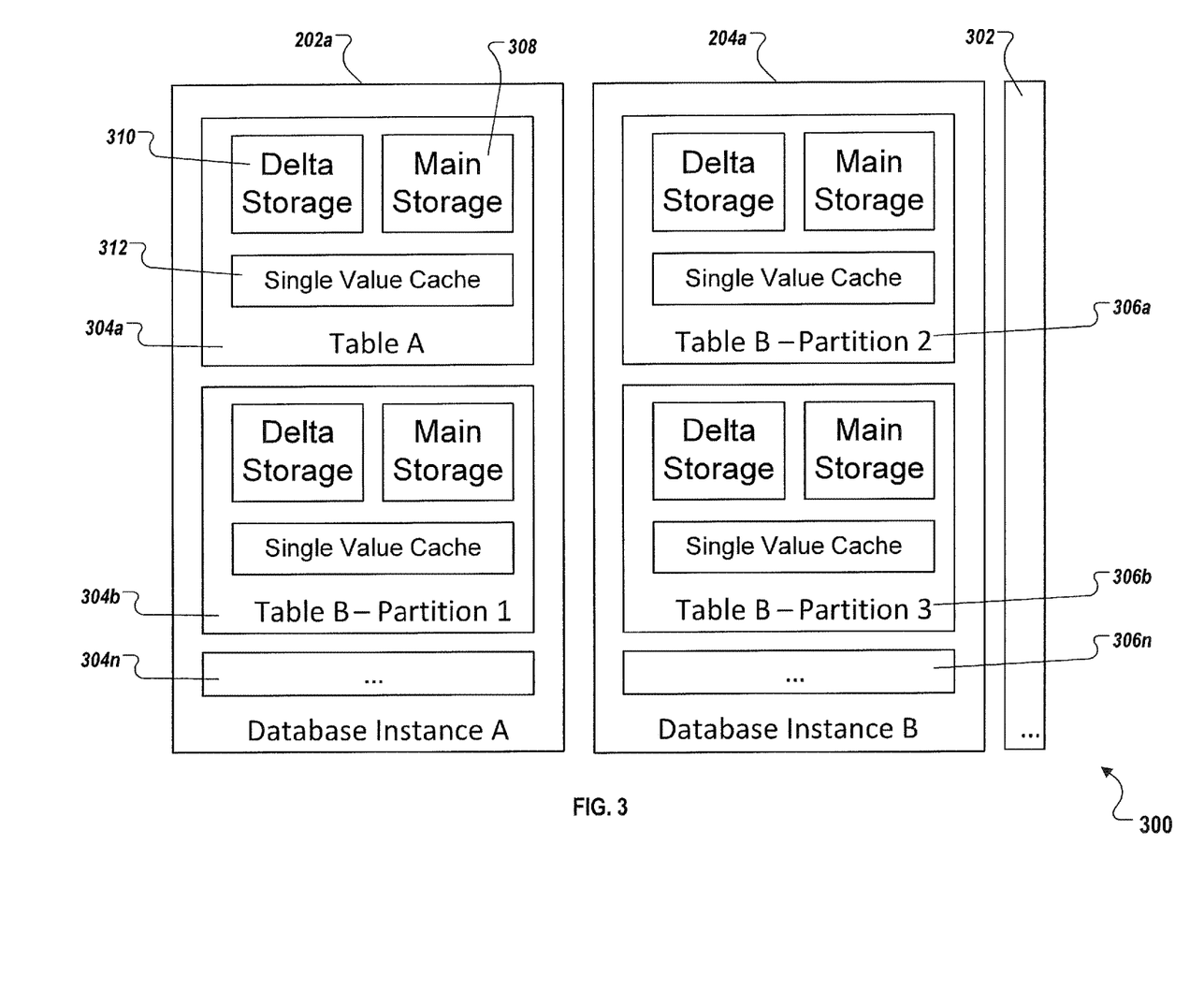
FIG. 3 is a block diagram illustrating example database tables associated with database instances of FIG. 2 according to an implementation.

FIG. 3 is a block diagram 300 illustrating example database tables associated with database instances of FIG. 2 according to an implementation. Multiple database instances are illustrated (e.g., 202a (Database Instance A), 204a (Database Instance B), and 302 (unnamed)). Each database instance is shown to be made up of database tables (e.g., Table A 304a, Table B—Partition a 304b, 304n (unnamed), Table B—Partition 2 306a, Table B—Partition 3 306b, and 306n (unnamed)). As illustrated, database tables, for example Table B, can be split between different database instances and into multiple partitions. Each database table/database table partition is configured with a main storage 308, delta storage 310, and a single value cache 312 (e.g., the three partitions of Table B as illustrated).

Figure 4:
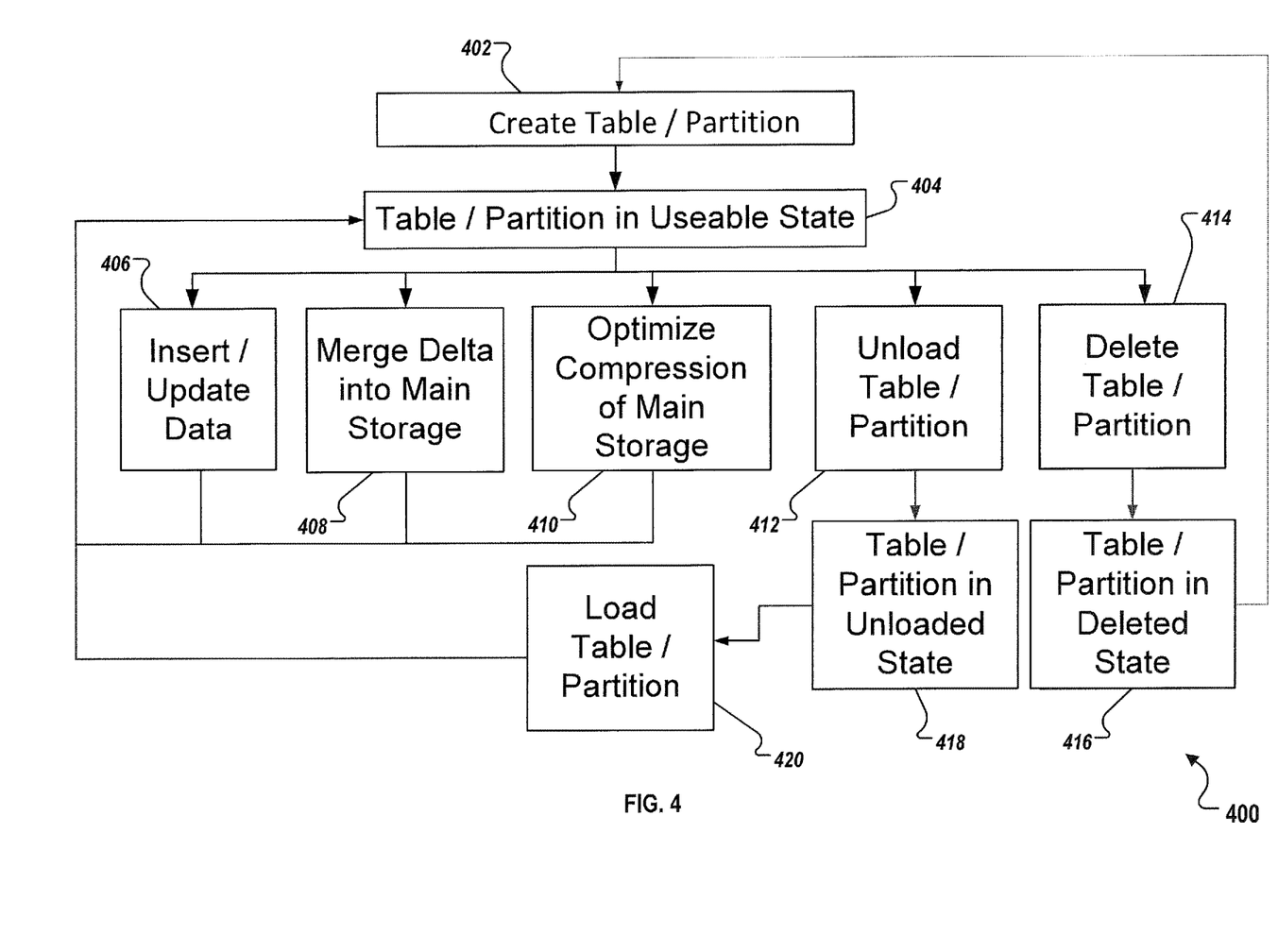
FIG. 4 is a flow chart illustrating single value cache state changes according to an implementation.

FIG. 4 is a flow chart 400 illustrating SVC state changes according to an implementation. This flow chart is one possible example of SVC state changes and is not meant to be limiting as to other possible state changes. For clarity of presentation, the description that follows generally describes flow 400 in the context of FIGS. 1-3. However, it will be understood that flow 400 may be performed, for example, by any other suitable system, environment, software, and hardware, or a combination of systems, environments, software, and hardware as appropriate. In some implementations, various steps of flow 400 can be run in parallel, in combination, in loops, and/or in any order.

At 402, a database table/database table partition (table) is created. The associated SVC is initialized based on the data present in the main and delta storage (e.g., 308 and 310 of FIG. 3). Note that if a table is being created, both stores are created but will contain no data, the SVC will be empty at this point in time. In the case where a table is being created from a data source (e.g., CREATE TABLE . . . AS SELECT FROM . . . ), the delta store will be filled with the data from the source (e.g., similar to normal INSERTS and will fill up the SVC) while the main storage will remain empty. Typically there is one SVC per table. In some implementations, there can be more than one SVC per table. From 402, flow 400 proceeds to 404.

At 404, the table is in a useable state. For example, it can be used to execute queries/operations against (e.g., INSERT, MERGE, etc.). From 404, flow 400 proceeds to one of 406, 408, 410, 412, and/or 414.

At 406, data is inserted/updated in the table. For example, if the table is empty and data is being inserted for a first time (e.g., empty table) into a single row, the data is also inserted into the associated SVC for the table. If a subsequent insert/update is performed, if the new data value is the same as that in the SVC, the previously cached value is not changed and left as-is for use. Otherwise (due to a difference in the value between that in the SVC and a new data value), the SVC is invalidated based on the new data value and marked as dirty. The cached data value will remain in the SVC until the next exclusively lock phase as described above. As dirty cache values can no longer be used, data must be read from the column in the traditional manner.

In some implementations, input data is handed in by an internal intermediate data structure (e.g., an 'internal table'). This structure is filled during query evaluation (e.g., given data in an INSERT statement). Now there are several cases:
1) First insert, single row to insert
2) First insert, multiple rows to insert
3) Not the first insert, single row to insert
4) Not the first insert, multiple rows to insert For 1), put the value in the SVC. For 2), check if all values in a column of the internal table contains one single value. If this is the case we can put it into the SVC. For 3) and 4) nothing is inserted into the SVC. Instead the SVC can be marked dirty if the data of the internal table does not match with the existing cache entry. From 406, flow 400 proceeds to 404.

At 408, a delta value is merged into a main storage for a table. This results in the main storage being updated to a more current value than a prior root/main value that would need one or more delta values applied against it to reflect the latest value. Due to the nature of this operation, an exclusive lock exists on the table. The SVC is checked and updated based on the data in the main storage and delta storage to ensure it is the most current. As an example, in some instances, rows could have been deleted from the table and during the merge operation, all deleted/non-visible rows are removed and could come into a state where one column has a unique value in it to assign to a SVC. From 408, flow 400 proceeds to 404.

At 410, compression of a main storage is optimized. Due to the nature of this operation, an exclusive lock exists on the table associated with the main storage. Following the optimization of the main storage compression, the SVC is checked and updated based on the data in the main storage and delta storage to ensure it is the most current. From 410, flow 400 proceeds to 404.

At 412, a table (or part of a table) is unloaded. In this instance, the associated SVC is deleted as it is no longer needed. From 412, flow 400 proceeds to 418 where the table of 412 is in an unloaded state. From 418, flow 400 proceeds to 420.

At 420, when the table is once again needed, the table is loaded. The SVC for the table is initialized based on the data in the main and delta storages. From 420, flow 400 proceeds to 404.

At 414, the table (or portion of a table) is deleted. The SVC associated with the table is deleted as it is not needed. From 416, flow 400 proceeds to 416 where the table is in a deleted state. After 416, flow 400 stops.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method comprising:
   initializing, by a computer, a single value cache associated with a column of a database table containing a single or unique data value, wherein each column of the database table is associated with a particular main storage and a particular delta storage, wherein the single value cache is initialized and marked for caching based on a computed finding of identical single or unique data values in both the particular main storage and the particular delta storage associated with the column of the database table, and wherein the particular delta storage contains changes from data in the particular main storage;
   verifying that the created database table is in a useable state;
   performing a database operation on the database table; and
   retrieving the data value from the single value cache without locking the column containing the cached single or unique data value.

2. The method of claim 1, wherein the single value cache is part of metadata associated with the database table.

3. The method of claim 1, wherein both the particular main storage and the particular delta storage are scanned individually for the single or unique values.

4. The method of claim 3, wherein data stored in the single value cache is stored as a raw data value.

5. The method of claim 3, wherein the particular main storage and the particular delta storage each has a data dictionary used to combine values in the particular main storage and the particular delta storage to determine if the single value cache should be persisted for the database table.

6. The method of claim 1, wherein in operations where the database table is exclusively locked, all table columns are scanned for single or unique values using a value dictionary associated with each column to determine how many distinct values are being used in each column.

7. The method of claim 1, wherein the single value cache is marked as dirty until an exclusively lock phase occurs for the database table.

8. The method of claim 1, wherein NULL values are treated as normal values.

9. A non-transitory, computer-readable medium storing computer-readable instructions executable by a computer and configured to:
initialize a single value cache associated with a column of a database table containing a single or unique data value, wherein each column of the database table is associated with a particular main storage and a particular delta storage, wherein the single value cache is initialized and marked for caching based on a computed finding of identical single or unique data values in both the particular main storage and the particular delta storage associated with the column of the database table, and wherein the particular delta storage contains changes from data in the particular main storage;
verify that the created database table is in a useable state;
perform a database operation on the database table; and
retrieve the data value from the single value cache without locking the column containing the cached single or unique data value.

10. The medium of claim 9, wherein the single value cache is part of metadata associated with the database table.

11. The medium of claim 9, wherein both the particular main storage and the particular delta storage are scanned individually for the single or unique values.

12. The medium of claim 11, wherein data stored in the single value cache is stored as a raw data value.

13. The medium of claim 11, wherein the particular main storage and the particular delta storage each has a data dictionary used to combine values in the particular main storage and the particular delta storage to determine if the single value cache should be persisted for the database table.

14. The medium of claim 9, wherein in operations where the database table is exclusively locked, all table columns are scanned for single or unique values using a value dictionary associated with each column to determine how many distinct values are being used in each column.

15. The medium of claim 9, wherein the single value cache is marked as dirty until an exclusively lock phase occurs for the database table.

16. The medium of claim 9, wherein NULL values are treated as normal values.

17. A system, comprising:
a memory;
at least one hardware processor interoperably coupled with the memory and configured to:
initialize a single value cache associated with a column of a database table containing a single or unique data value, wherein each column of the database table is associated with a particular main storage and a particular delta storage, wherein the single value cache is initialized and marked for caching based on a computed finding of identical single or unique data values in both the particular main storage and the particular delta storage associated with the column of the database table, and wherein the particular delta storage contains changes from data in the particular main storage;
verify that the created database table is in a useable state;
perform a database operation on the database table; and
retrieve the data value from the single value cache without locking the column containing the cached single or unique data value.

18. The system of claim 17, wherein the single value cache is part of metadata associated with the database table, both the particular main storage and the particular delta storage are scanned individually for the single or unique values, and data stored in the single value cache is stored as a raw data value.

19. The system of claim 18, wherein the particular main storage and the particular delta storage each has a data dictionary used to combine values in the particular main storage and the particular delta storage to determine if the single value cache should be persisted for the database table.

20. The system of claim 17, wherein in operations where the database table is exclusively locked:
all table columns are scanned for single or unique values using a value dictionary associated with each column to determine how many distinct values are being used in each column; and
a single value cache marked as dirty is unmarked.

* * * * *